(12) United States Patent
Hapsari et al.

(10) Patent No.: US 10,841,933 B2
(45) Date of Patent: Nov. 17, 2020

(54) BASE STATION FOR MAPPING DATA FLOW TO RADIO BEARERS

(71) Applicant: NTT DOCOMO, INC., Tokyo (JP)

(72) Inventors: Wuri Andarmawanti Hapsari, Tokyo (JP); Tooru Uchino, Tokyo (JP); Hideaki Takahashi, Tokyo (JP); Ryusuke Matsukawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/697,840

(22) Filed: Sep. 7, 2017

(65) Prior Publication Data

US 2018/0049218 A1 Feb. 15, 2018

(30) Foreign Application Priority Data

Aug. 10, 2016 (JP) ................................. 2016-158273

(51) Int. Cl.
*H04W 72/04* (2009.01)
*H04W 72/12* (2009.01)
*H04W 76/11* (2018.01)
*H04W 28/24* (2009.01)
*H04W 76/12* (2018.01)
(Continued)

(52) U.S. Cl.
CPC ....... *H04W 72/1242* (2013.01); *H04W 28/24* (2013.01); *H04W 76/11* (2018.02); *H04L 47/24* (2013.01); *H04L 47/805* (2013.01); *H04W 76/12* (2018.02)

(58) Field of Classification Search
CPC . H04W 72/1242; H04W 76/11; H04W 76/12; H04W 28/24; H04L 47/805; H04L 47/24
See application file for complete search history.

(56) References Cited

U.S. PATENT DOCUMENTS

2014/0328288 A1 11/2014 Lu et al.
2016/0050682 A1 2/2016 Uchino et al.
(Continued)

FOREIGN PATENT DOCUMENTS

EP 3445081 A1 * 2/2019 ............ H04W 28/02
JP 2014204334 A 10/2014
(Continued)

OTHER PUBLICATIONS

3GPP TR 38.913 V0.3.0; "3rd Generation Partnership Project; Technical Specification Group Radio Access Network; Study on Scenarios and Requirements for Next Generation Access Technologies; (Release 14)"; Mar. 2016 (30 pages).
(Continued)

*Primary Examiner* — Hassan Kizou
*Assistant Examiner* — Mahbubul Bar Chowdhury
(74) *Attorney, Agent, or Firm* — Osha Bergman Watanabe & Burton LLP

(57) ABSTRACT

Mapping schemes of data flows to radio bearers in flow-based QoS control are disclosed. One aspect of the present invention relates to a base station including a data flow reception unit configured to receive a data flow having a flow identifier and a flow priority via one or more tunnels and a data flow mapping unit configured to map the received data flow to a radio bearer in accordance with mapping based on one or more of the flow identifier, the flow priority and the tunnels.

2 Claims, 11 Drawing Sheets

(51) Int. Cl.
   *H04L 12/851* (2013.01)
   *H04L 12/927* (2013.01)

(56) References Cited

U.S. PATENT DOCUMENTS

| | | | | |
|---|---|---|---|---|
| 2016/0302110 | A1* | 10/2016 | Baboescu | H04L 12/4633 |
| 2017/0005834 | A1* | 1/2017 | Hinkle | H04L 45/02 |
| 2017/0289046 | A1* | 10/2017 | Faccin | H04L 47/2441 |
| 2018/0041936 | A1* | 2/2018 | Kim | H04W 4/70 |
| 2018/0317121 | A1* | 11/2018 | Liao | H04W 28/0268 |

FOREIGN PATENT DOCUMENTS

| | | | | |
|---|---|---|---|---|
| JP | 2015505445 A | | 2/2015 | |
| WO | WO-2017177753 A1 | * | 10/2017 | ............ H04W 28/02 |
| WO | WO-2018026169 A1 | * | 2/2018 | ............ H04W 28/02 |

OTHER PUBLICATIONS

3GPP TR 38.804 V0.2.0; "3rd Generation Partnership Project; Technical Specification Group Radio Access Network; Study on New Radio Access Technology; Radio Interface Protocol Aspects (Release 14)"; May 2016 (11 pages).

3GPP TS 23.401 V14.0.0; "3rd Generation Partnership Project; Technical Specification Group Services and System Aspects; General Packet Radio Service (GPRS) enhancements for Evolved Universal Terrestrial Radio Access Network (E-UTRAN) access (Release 14)"; Jun. 2016 (374 pages).

3GPP TR 23.799 V0.6.0; "3rd Generation Partnership Project; Technical Specification Group Services and System Aspects; Study on Architecture for Next Generation System (Release 14)"; Jul. 2016 (320 pages).

3GPP TSG SA WG2; S2-063481 "QoS in an IP based SAE" QUALCOMM Europe; Busan, Korea; Oct. 23-27, 2006 (4 pages).

3GPP TSG-RAN WG3 #72 meeting; R3-111450 "Duplicate S1-U SGW TEIDs at eNB" Nokia Siemens Networks; Barcelona Spain; May 9-13, 2011 (3 pages).

Office Action issued in Japanese Application No. 2016-158273; dated Jan. 14, 2020 (7 pages).

* cited by examiner

BASE STATION FOR MAPPING DATA FLOW TO RADIO BEARERS

BACKGROUND OF THE INVENTION

1. Field of the Invention

The present invention relates to a radio communication system.

2. Description of the Related Art

In an LTE (Long Term Evolution) system and an LTE-Advanced system, QoS (Quality of Service) control on data is implemented using bearers. As illustrated in FIG. 1, EPS (Evolved Packet System) bearers are configured between user equipment and a PDN GW (Packet Data Network Gateway) in a core network, that is, in an end-to-end. Further, radio bearers (Data Radio Bearers: DRBs) are configured between user equipment and a base station (evolved Node B), an S1-U bearer is configured between the base station and an S-GW (Serving Gateway) in the core network, and an S5 bearer is configured between the S-GW and the PDN GW. Further, the radio bearers, the S1-U bearer, and the S5 bearer are mapped in a one-to-one manner.

Meanwhile, in 3GPP (Third Generation Partnership Project), standardization for next generation (Next Gen) or the fifth generation (5G) is being discussed. In a 5G system, as illustrated in FIG. 2, it is discussed that flow-based QoS control is adopted in the network in place of the respective bearers described above. In other words, the radio bearers are configured between the user equipment and the base station (NR (New Radio Access Technology) Node), whereas a tunnel is configured between the base station and the core network (NextGenCore) to transmit various kinds of data flows collectively through the tunnel.

SUMMARY OF THE INVENTION

More specifically, as illustrated in FIG. 3, a PDN connection (also referred to as a PDU (Packet Data Unit) connection) is established between the core network (CN) and the user equipment. A QoS rule for data flow transmitted through the PDN connection is indicated with NAS (Non Access Stratum) signaling (NG 1 signaling) between the core network and the user equipment. Examples of the QoS rule include a default QoS, a pre-authorized QoS and the like.

As illustrated, in the network, a tunnel (which may be a GTP (GPRS (General Packet Radio Service) Tunneling Protocol)) is established between an APN, a PDN or a U-plane function of the core network and the base station, and a data flow is transmitted within the tunnel. A flow identifier (Flow ID) and/or a flow priority (Flow Priority Index: FPI) of each data flow can be attached to a header of a tunneling protocol, and the flow identifier and/or the flow priority are allocated to each data in the data flow as illustrated.

However, it has not been discussed how to allocate respective data transmitted via the tunnel in the network to the radio bearers configured between the base station and the user equipment.

In light of the above-stated problems, it is an object of the present invention to provide a mapping scheme of the data flow to the radio bearers in the flow-based QoS control.

In order to overcome the above problems, one aspect of the present invention relates to a base station, comprising: a data flow reception unit configured to receive a data flow having a flow identifier and a flow priority via one or more tunnels; and a data flow mapping unit configured to map the received data flow to a radio bearer in accordance with mapping based on one or more of the flow identifier, the flow priority and the tunnels.

According to the above aspect, a mapping scheme of the data flow to the radio bearers in the flow-based QoS control can be provided.

DESCRIPTION OF THE PREFERRED EMBODIMENTS

Embodiments of the present invention are described in detail below with reference to the drawings.

In the following embodiments, a core network, a base station, and user equipment for implementing flow-based QoS control are disclosed. As a brief overview of embodiments as described later, when receiving a data flow from the core network via a tunnel configured between the core network and the base station, the base station maps the received data flow to radio bearers per flow identifier, per combination of a flow identifier and a flow priority, per flow priority or per tunnel and transmits the data flow to the user equipment through the QoS-controlled radio bearers.

Figure 1:
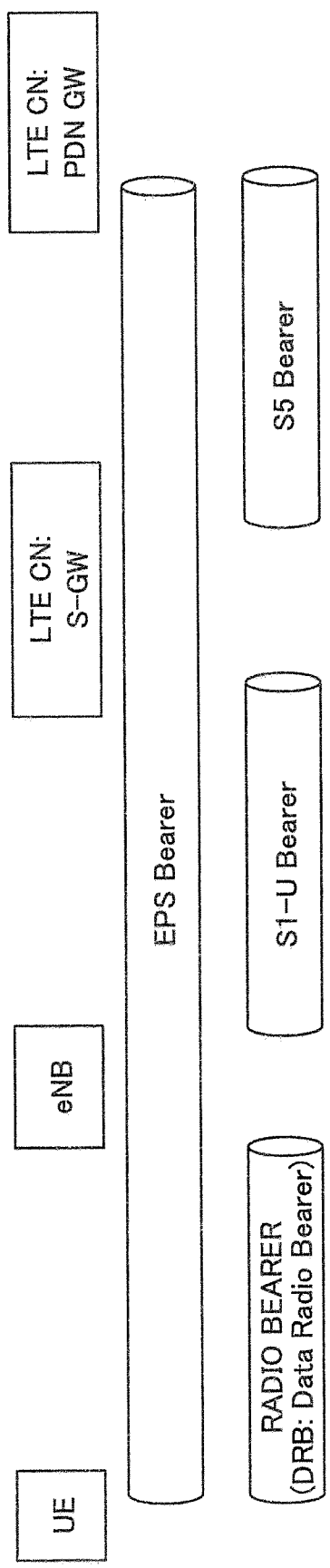
FIG. 1 is a schematic diagram illustrating QoS control in an LTE system.
Figure 2:
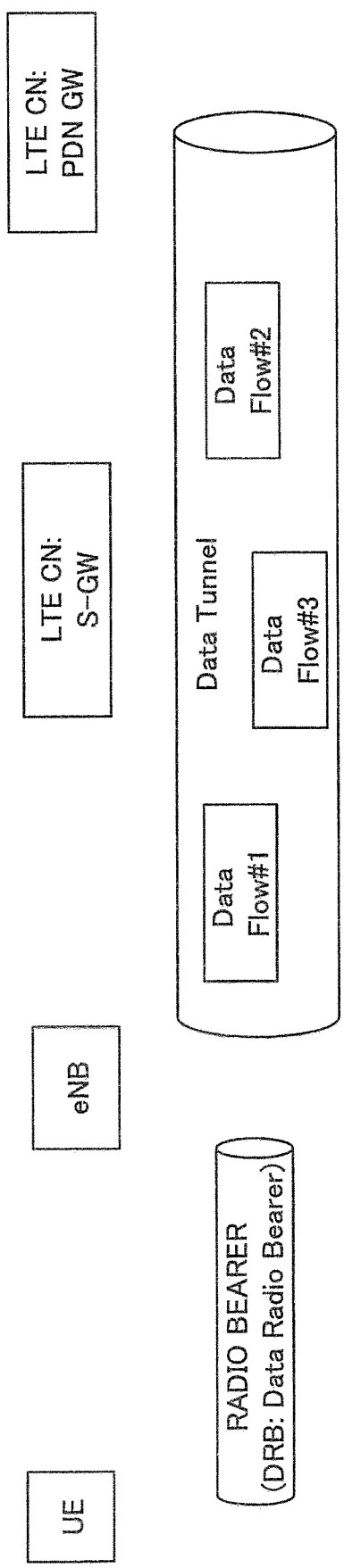
FIG. 2 is a schematic diagram illustrating flow-based QoS control.
Figure 3:
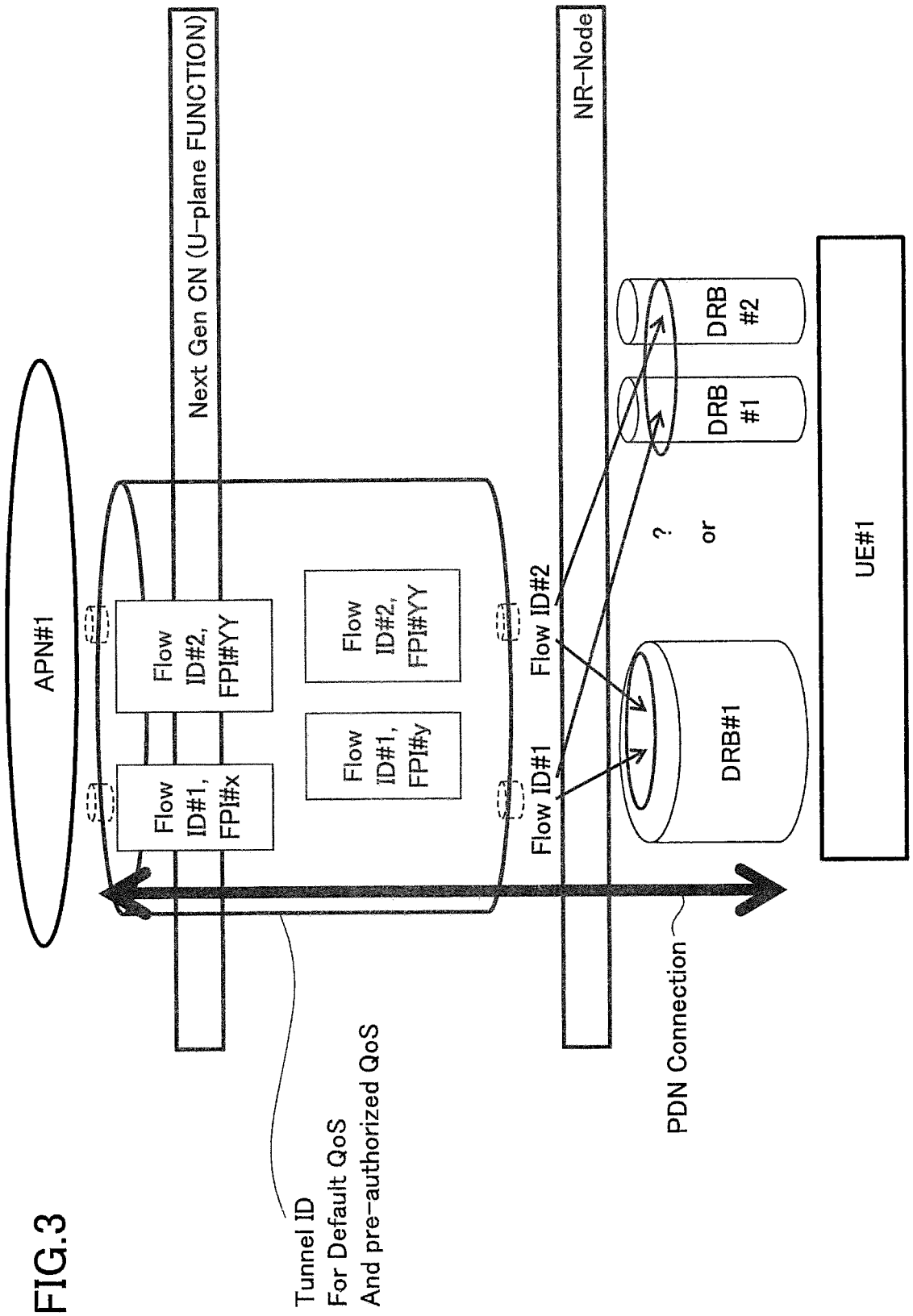
FIG. 3 is a schematic diagram illustrating mapping of data flows to radio bearers in the flow-based QoS control.
Figure 4:
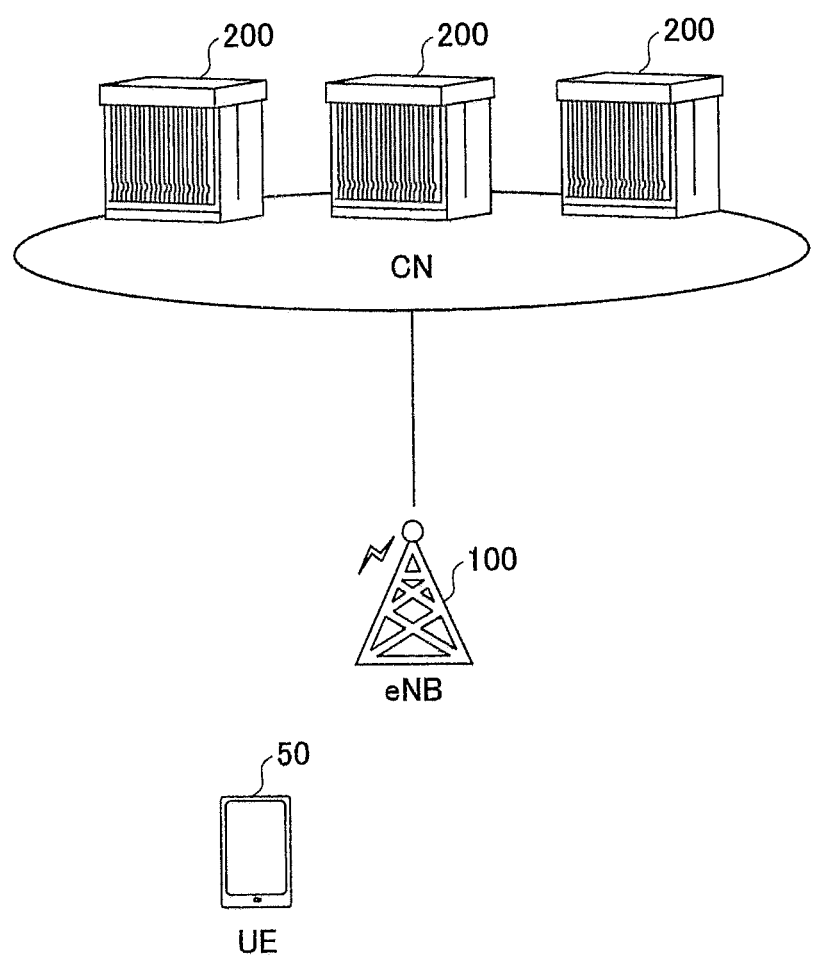
FIG. 4 is a schematic diagram illustrating a radio communication system according to one embodiment of the present invention.

At the outset, a radio communication system according to one embodiment of the present invention will be described with reference to FIG. 4. FIG. 4 is a schematic diagram illustrating a radio communication system according to one embodiment of the present invention.

As illustrated in FIG. 4, the radio communication system 10 includes user equipment (UE) 50, a base station (NR Node) 100, and a core network (CN) 200. In the following embodiments, the radio communication system 10 is a radio communication system (for example, a 5G system) conforming to Rel-14 or later standard of 3GPP, but the present invention is not limited thereto. The radio communication system 10 may be any other radio communication system where the flow-based QoS control is applied.

The user equipment 50 is any appropriate information processing device with radio communication functionalities such as a smartphone, a mobile phone, a tablet, a wearable terminal or a communication module for M2M (Machine-to-Machine) and is wirelessly connected to the base station 100 under management of the core network 200 and uses various kinds of communication services provided in the radio communication system 10. In the following embodiments, the user equipment 50 transmits and receives signals to and from the base station 100 using an AS layer conforming to an AS protocol and transmits and receives signals to and from the core network 200 using a NAS layer conforming to a NAS protocol.

The base station 100 serves one or more cells and performs radio communication with the user equipment 50 via the cells under management of the core network 200 including an MME (Mobility Management Entity), an S-GW, a PDN GW and the like. In the illustrated embodiment, only the single base station 100 is illustrated, but a plurality of base stations 100 are generally arranged to cover a service area of the radio communication system 10.

The core network 200 manages the radio communication between the base station 100 and the user equipment 50 in accordance with various kinds of radio controls such as location registration, inter-base station handover, cell reselection and discontinuous reception control and serves as a gateway between an external network such as the Internet and the user equipment 50.

In the following embodiments, a tunnel is configured between core network 200 and the base station 100, and data flows are transmitted from the core network 200 to the base station 100 via the tunnel. A flow identifier (Flow ID) and/or a flow priority (FPI) are allocated to each data flow. Upon receiving the data flow from the core network 200, the base station 100 maps received data to radio bearers in accordance with a predetermined mapping rule as detailed below and transmits the data flow to the user equipment 50 via the QoS-controlled radio bearers. For downlink data, in a MAC (Medium Access Control) layer in the base station 100, an LCP (Logical Channel Priority) and/or an LCG (Logical Channel Group) can be associated per radio bearer. As a result, at radio scheduling between the user equipment 50 and the base station 100, priority control may be performed such that the LCP and/or the LCG are associated per radio bearer. Therefore, the "mapping to the radio bearers" herein includes mapping to the LCP and/or the LCG in addition to distribution of the data flows to the radio bearers.

Figure 5:
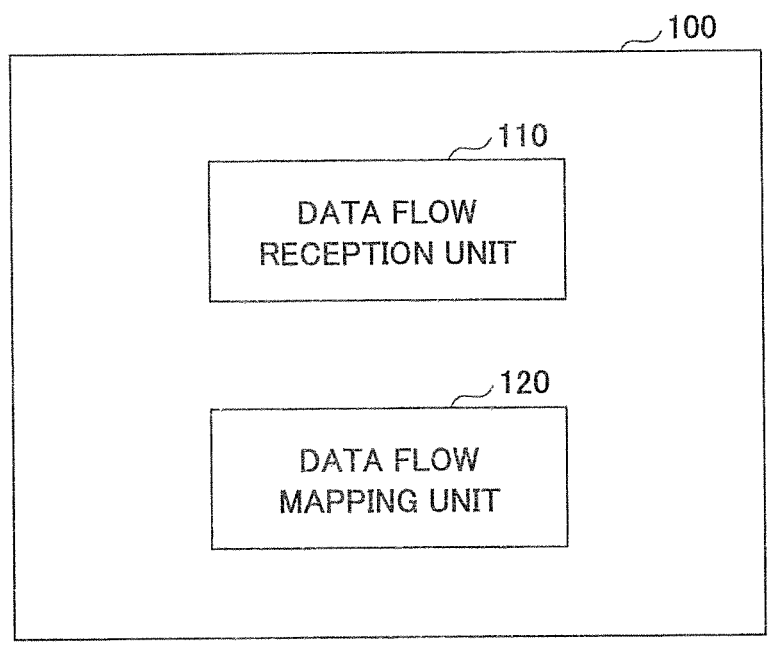
FIG. 5 is a block diagram illustrating a functional arrangement of a base station according to one embodiment of the present invention.

Next, the base station according to one embodiment of the present invention will be described with reference to FIG. 5. FIG. 5 is a block diagram illustrating a functional arrangement of the base station according to one embodiment of the present invention.

As illustrated in FIG. 5, the base station 100 includes a data flow reception unit 110 and a data flow mapping unit 120.

The data flow reception unit 110 receives a data flow having a flow identifier and a flow priority via one or more tunnels. Specifically, the data flow reception unit 110 receives the data flow through the tunnel configured between an APN or a U-plane function of the core network 200 and the base station 100. Each tunnel is identified by a tunnel identifier (ID), and a QoS rule such as default QoS or pre-authorized QoS is assigned to each tunnel. A flow identifier (Flow ID) and/or a flow priority (FPI) are allocated to each piece of data of the data flow transmitted via the tunnel.

The data flow mapping unit 120 maps the received data flow to a radio bearer in accordance with to mapping based on one or more of the flow identifier, the flow priority and the tunnel. More specifically, as described in detail later, the data flow mapping unit 120 distributes each data to a radio bearer (DRB) in accordance with mapping per flow identifier (Flow ID), per combination (Flow ID, FPI) of the flow identifier and the flow priority, per flow priority (FPI) or per tunnel (Tunnel ID) and transmits the data flow to the user equipment 50 through the QoS-controlled radio bearers.

Figure 6:
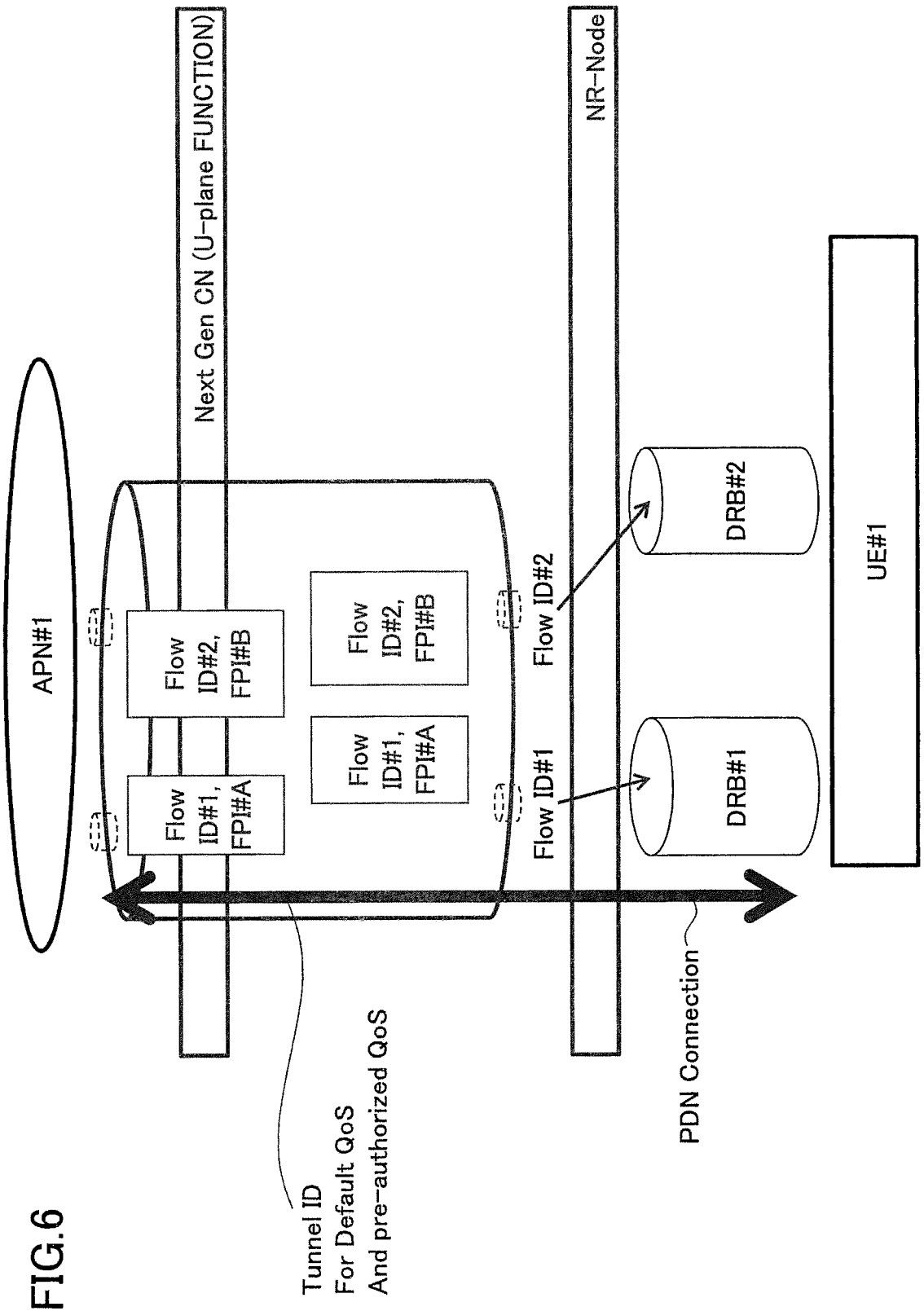
FIG. 6 is a schematic diagram illustrating a mapping scheme according to a first embodiment of the present invention.

Next, a mapping scheme according to the first embodiment of the present invention will be described with reference to FIG. 6. In the first embodiment, the data flow mapping unit 120 maps the received data flow to a radio bearer in accordance with the mapping per flow identifier. FIG. 6 is a schematic diagram illustrating the mapping scheme according to the first embodiment of the present invention.

As illustrated in FIG. 6, the data flow reception unit 110 receives two data pieces having the flow identifier #1 and the FPI #A and two data pieces having the flow identifier #2 and the FPI #B via a tunnel of APN #1.

In the present embodiment, the data flow mapping unit 120 maps the received data flow to the radio bearers in a per-flow identifier basis and transmits the data flow to the user equipment 50 through the respective radio bearers. In other words, the data flow mapping unit 120 allocates the two data pieces having the flow identifier #1 to DRB #1 and the two data pieces having the flow identifier #2 to DRB #2, respectively, and transmits the data flows to the user equipment 50 through the two DRBs #1 and #2.

For the sake of convenience of description, only the single tunnel is configured in the illustrated specific example, but it will be easily understood by those skilled in the art that the present embodiment is equally applicable to a plurality of tunnels.

Figure 7:
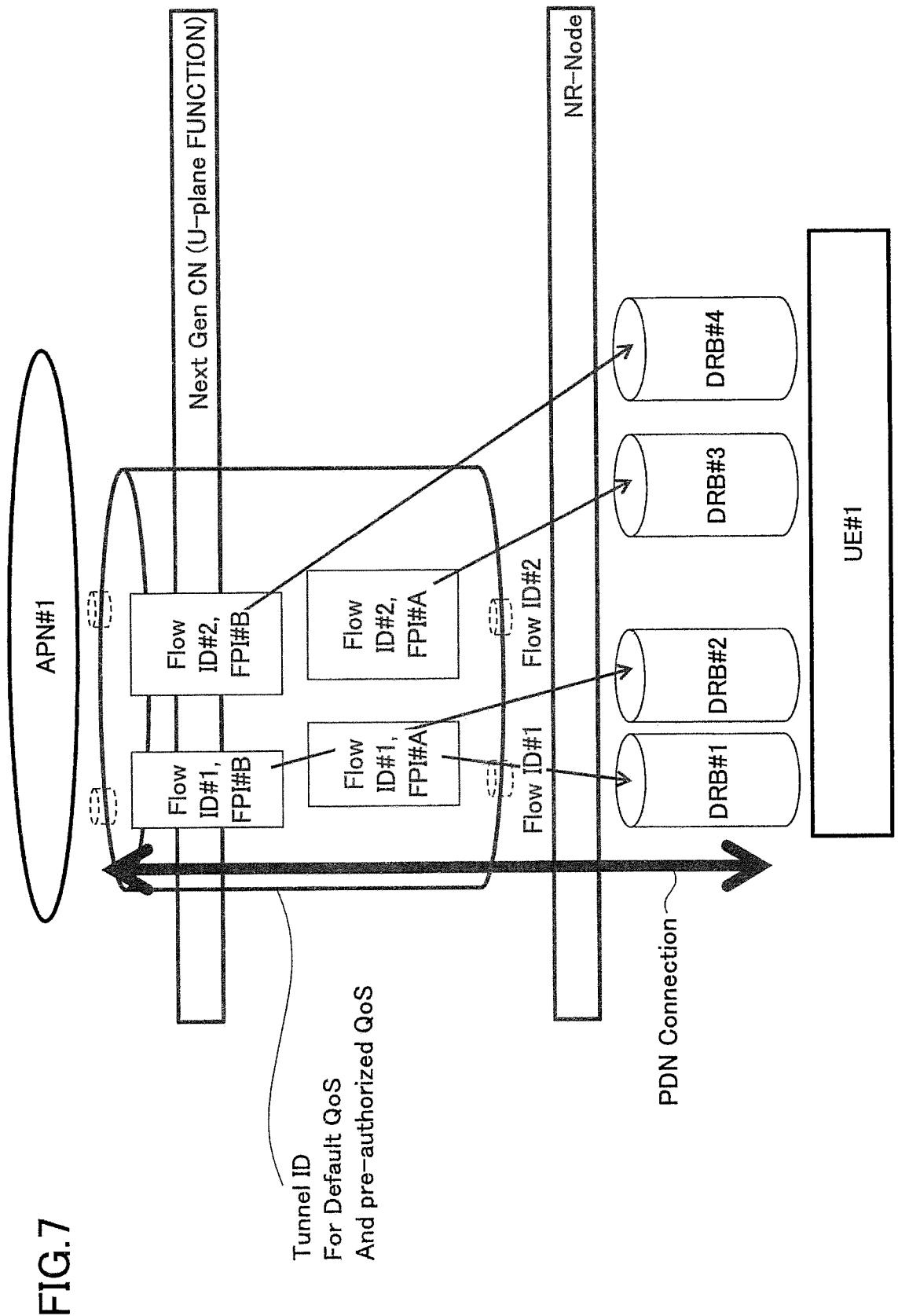
FIG. 7 is a schematic diagram illustrating a mapping scheme according to a second embodiment of the present invention.

Next, a mapping scheme according to the second embodiment of the present invention will be described with reference to FIG. 7. In the second embodiment, the data flow mapping unit 120 maps the received data flow to radio bearers in accordance with mapping per combination of the flow identifier and the flow priority. FIG. 7 is a schematic diagram illustrating the mapping scheme according to the second embodiment of the present invention.

As illustrated in FIG. 7, the data flow reception unit 110 receives four data pieces, that is, data having the flow identifier #1 and the FPI #A, data having the flow identifier #1 and the FPI #B, data having the flow identifier #2 and the FPI #A, and data having the flow identifier #2 and the FPI #B through a tunnel of the APN #1.

In the present embodiment, the data flow mapping unit 120 maps the received data flow to radio bearers in a per-combination basis of the flow identifier and the flow priority and transmits the data flow to the user equipment 50 through the respective radio bearers. In other words, the data flow mapping unit 120 allocates the data having the flow identifier #1 and the FPI #A to DRB #1, the data having the flow identifier #1 and the FPI #B to DRB #2, allocates the data having the flow identifier #2 and the FPI #A to DRB #3 and allocates the data having the flow identifier #2 and the FPI #B to DRB #4. Then, the data mapping unit 120 transmits the data flow to the user equipment 50 through the four DRBs #1 to #4.

For the sake of convenience of description, only the single tunnel is configured in the illustrated specific example, but it will be easily understood by those skilled in the art that the present embodiment is equally applicable to a plurality of tunnels.

Figure 8:
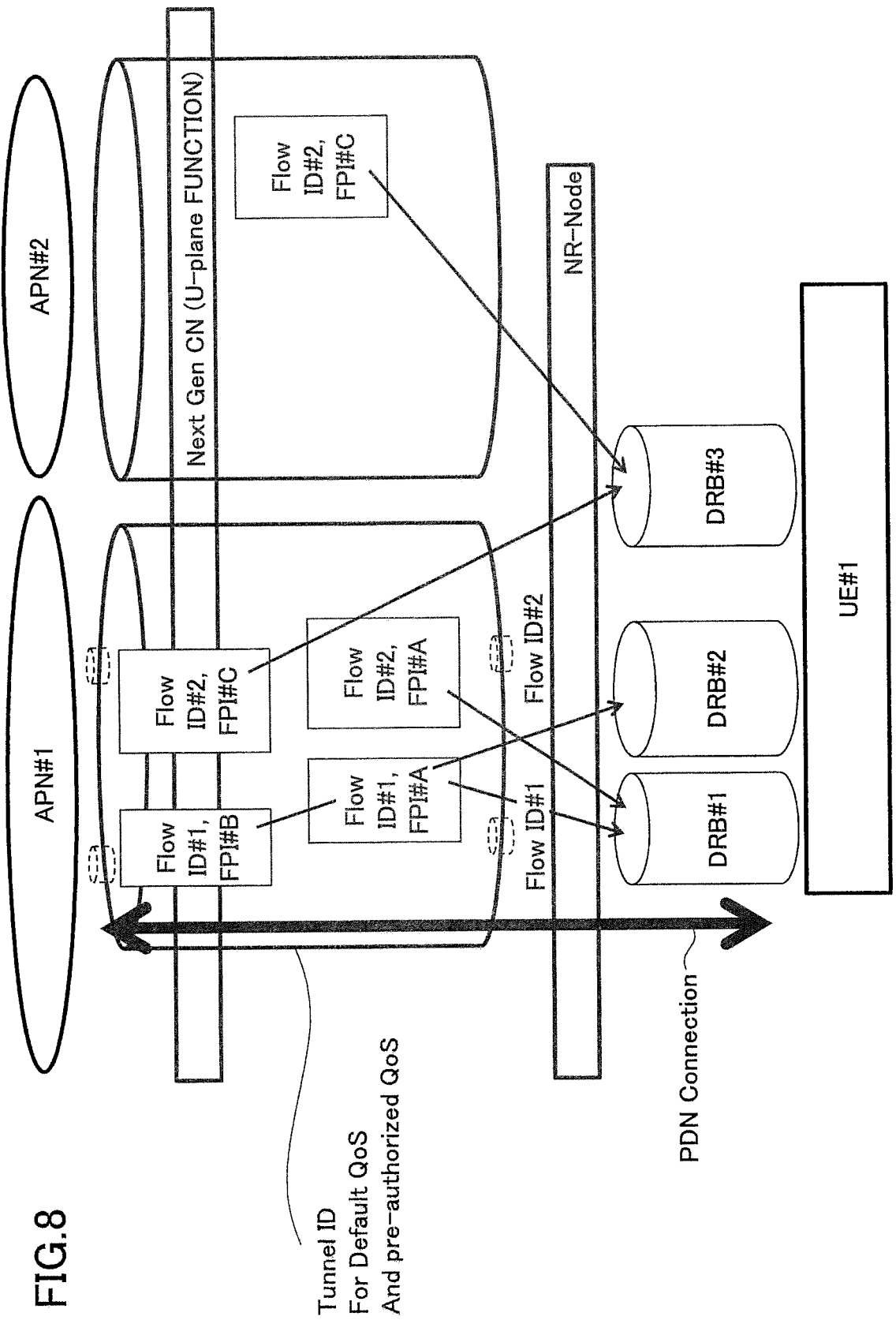
FIG. 8 is a schematic diagram illustrating a mapping scheme according to a third embodiment of the present invention.

Next, a mapping scheme according to the third embodiment of the present invention will be described with reference to FIG. 8. In the third embodiment, the data flow mapping unit 120 maps the received data flow to radio bearers in accordance with mapping per flow priority. FIG. 8 is a schematic diagram illustrating the mapping scheme according to the third embodiment of the present invention.

As illustrated in FIG. 8, the data flow reception unit 110 receives four data pieces, that is, data having the flow identifier #1 and the FPI #A, data having the flow identifier #1 and the FPI #B, data having the flow identifier #2 and the FPI #A, and data having the flow identifier #2 and the FPI #C through a tunnel of the APN #1. Further, the data flow reception unit 110 receives data having the flow identifier #2 and the flow priority #C via a tunnel of an APN #2.

In the present embodiment, the data flow mapping unit 120 maps the received data flow to radio bearers in a per-flow priority basis and transmits the data flow to the user equipment 50 through the respective radio bearers. In other words, the data flow mapping unit 120 allocates the two data pieces having the flow priority #A to DRB #1, allocates the one data piece having the flow priority #B to DRB #2 and allocates the two data pieces having the flow priority #C to DRB #3 and transmits the data flows to the user equipment 50 through the three DRBs #1 to #3.

Figure 9:
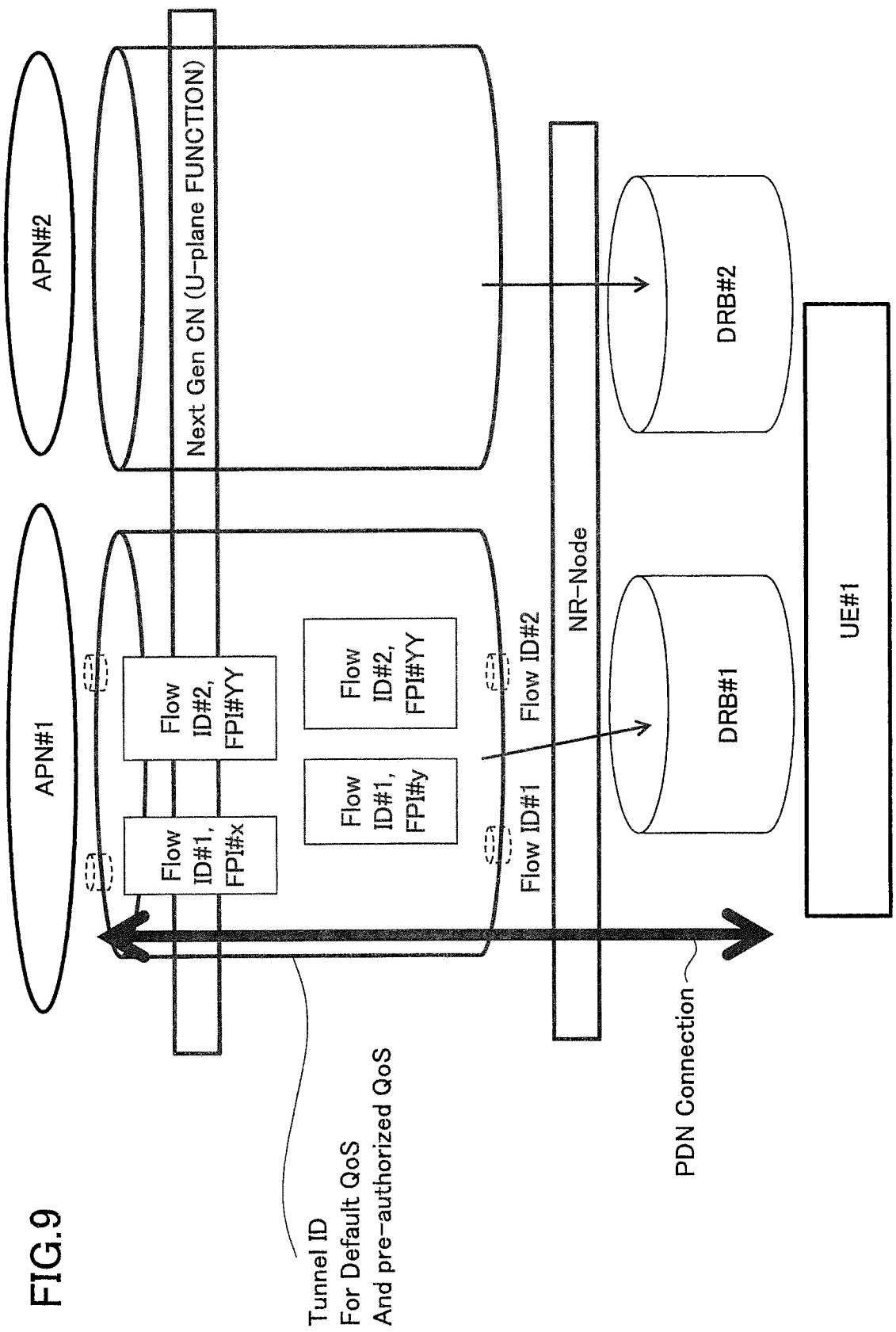
FIG. 9 is a schematic diagram illustrating a mapping scheme according to a fourth embodiment of the present invention.

Next, a mapping scheme according to the fourth embodiment of the present invention will be described with reference to FIG. 9. In the fourth embodiment, the data flow mapping unit 120 maps the received data flow to radio bearers in accordance with mapping per tunnel. FIG. 9 is a schematic diagram illustrating the mapping scheme according to the fourth embodiment of the present invention.

As illustrated in FIG. 9, the data flow reception unit 110 receives a data piece having the flow identifier #1 and the FPI #y, a data piece having the flow identifier #1 and the FPI #x, and two data pieces having the flow identifier #2 and the FPI #YY via a tunnel of the APN #1. Further, the data flow reception unit 110 receives data having any flow identifier and any flow priority (not illustrated) via a tunnel of APN #2.

In the present embodiment, the data flow mapping unit 120 maps the received data flow to radio bearers in a per-tunnel basis and transmits the data flows to the user equipment 50 through the respective radio bearers. In other words, the data flow mapping unit 120 allocates the four data pieces received via the tunnel of the APN #1 to the DRB #1 and the data (not illustrated) received via the tunnel of the APN #2 to the DRB #2, respectively, and transmits the data flows to the user equipment 50 through the two DRBs #1 and #2.

Figure 10:
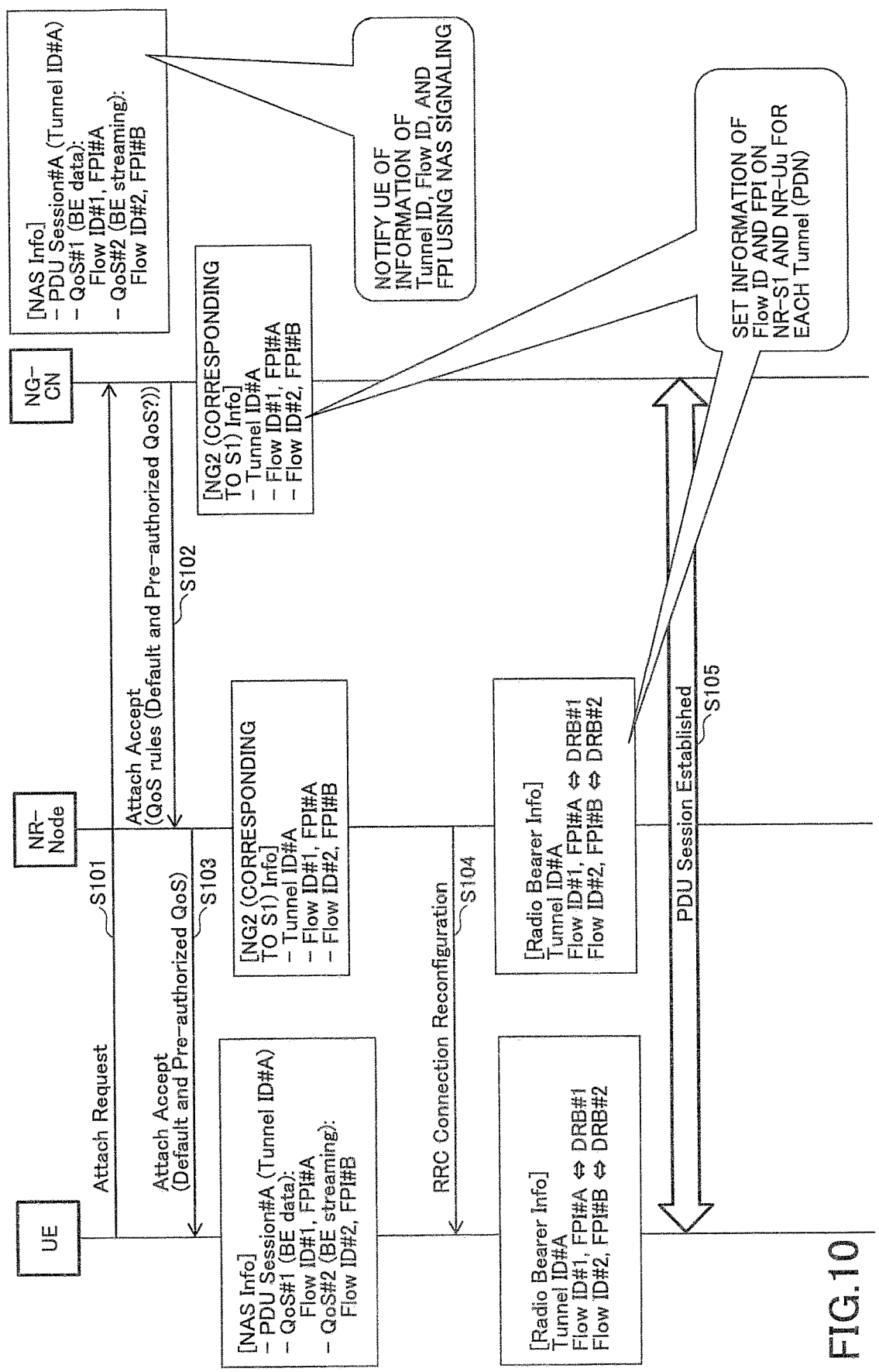
FIG. 10 is a sequence diagram illustrating C-plane signaling according to one embodiment of the present invention.

Next, C-plane signaling for the QoS control according to one embodiment of the present invention will be described with reference to FIG. 10. FIG. 10 is a sequence diagram illustrating the C-plane signaling according to one embodiment of the present invention. This process may be performed, for example, when the user equipment 50 attaches the base station 100.

As illustrated in FIG. 10, at step S101, the user equipment 50 transmits an Attach Request to the base station 100, and the base station 100 transmits the Attach Request to the core network 200.

At step S102, the core network 200 transmits an Attach Accept to the base station 100 and uses NAS signaling to indicate an NAS Info to the user equipment 50 for indicating QoS information related to a tunnel ID, a flow ID and an FPI. Further, the core network 200 indicates flow information configured between the base station 100 and the core network 200 to the base station 100 with an NG 2 Info as illustrated.

At step S103, the base station 100 transfers the NAS Info received from the core network 200 to the user equipment 50.

At step S104, the base station 100 transmits an RRC Connection Reconfiguration to the user equipment 50 to indicate a radio configuration including radio bearer information (Radio Bearer Infor) as illustrated. The user equipment 50 can identify the data flows transmitted from the base station 100 through respective radio bearers based on the received radio bearer information.

At step S105, a PDU session is established among the user equipment 50, the base station 100 and the core network 200, and data flow communication in accordance with the flow-based QoS control can be implemented.

In the block diagrams used in the description of the above embodiment, the blocks of the functional units are illustrated. The functional blocks (configuring units) are implemented by an arbitrary combination of hardware and/or software. A device of implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

Figure 11:
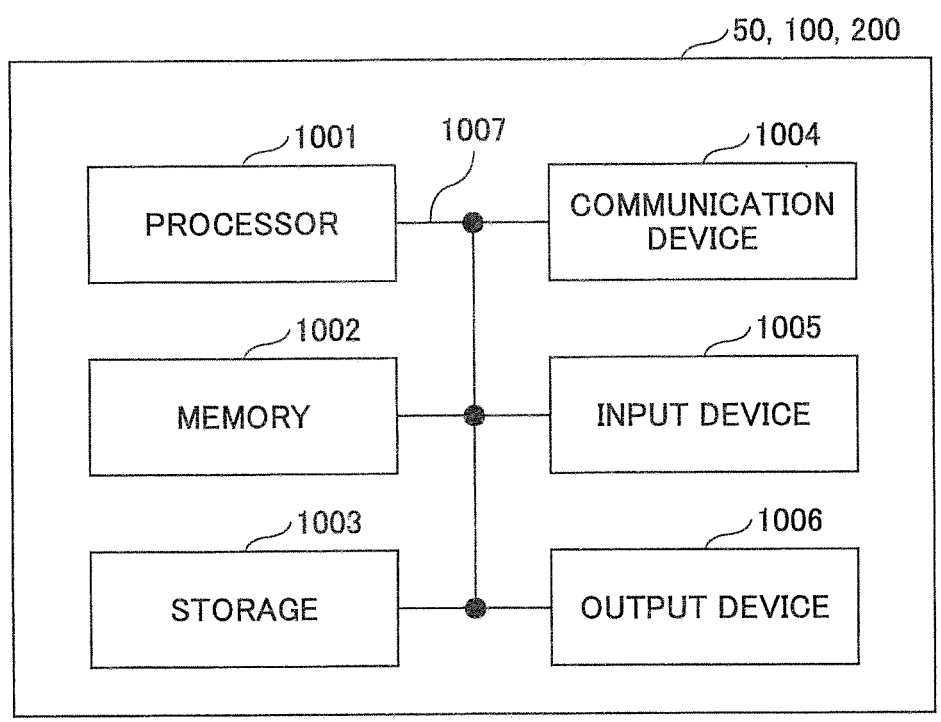
FIG. 11 is a block diagram illustrating a hardware arrangement of user equipment, a base station, and a core network according to one embodiment of the present invention.

For example, each of the user equipment 50, the base station 100, and the core network 200 in one embodiment of the present invention may function as a computer that performs the process of the radio communication method of the present invention. FIG. 11 is a block diagram illustrating a hardware configuration of each of the user equipment 50, the base station 100, and the core network 200 according to one embodiment of the present invention. Each of the user equipment 50, the base station 100, and the core network 200 described above may be physically configured as a computer device that includes a processor 1001, a memory 1002, a storage 1003, a communication device 1004, an input device 1005, an output device 1006, a bus 1007, and the like.

In the following description, the term "device" can be replaced with a circuit, a device, a unit, or the like. The hardware configuration of each of the user equipment 50, the base station 100, and the core network 200 may be configured to include one or more devices illustrated in the drawing or may be configured without including some devices.

Each function in each of the user equipment 50, the base station 100, and the core network 200 is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like. For example, each component of the base station 100 described above may be implemented by the processor 1001.

Further, the processor 1001 reads a program (a program code), a software module, and data from the storage 1003 and/or the communication device 1004 out to the memory 1002, and performs various kinds of processes according to them. A program causing a computer to execute at least some of the operations described in the above embodiment is used as the program. For example, the process performed by each component in each of the user equipment 50, the base station 100, and the core network 200 may be implemented by a control program which is stored in the memory 1002 and operates on the processor 1001, or the other functional blocks may be similarly implemented. Various kinds of processes have been described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 is also referred to as a "register," a "cache," a "main memory," or the like. The memory 1002 can store programs (program codes), software modules, or the like which are executable for carrying out the radio communication method according to an embodiment of the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transceiver device) for performing communication between computers via a wired and/or wireless network and is also referred to as a "network device," a "network controller," a "network card," a "communication module," or the like. For example, it may be implemented by each component of the base station 100

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The respective devices such as the processor 1001 and the memory 1002 are connected via the bus 1007 to communicate information with each other. The bus 1007 may be configured with a single bus or may be configured with different buses between the devices.

Further, each of the user equipment 50, the base station 100, and the core network 200 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

Indication of information is not limited to the aspect or embodiment described in this specification and may be given by any other method. For example, the notification of information may be given physical layer signaling (for example, Downlink Control Information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, or the like.

Each aspect and embodiment described in this specification is applicable to LTE, LTE-A, SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), and systems using any other appropriate systems and/or next generation systems expanded on the basis of the systems.

The processing procedures, the sequences, the flowcharts, and the like of the respective aspects/embodiments described in this specification may be reversed in order unless there is a contradiction. For example, the method described in this specification presents elements of various steps in an exemplary order and is not limited to a presented specific order.

In the present specification, a specific action that is supposed to be performed by the base station 100 may be performed by an upper node in some cases. In the network configured with one or more network nodes including the base station, various actions performed for communication with the terminal can be obviously performed by the base station and/or any network node (for example, an MME, an S-GW, or the like is considered, but it is not limited thereto) other than the base station. The example in which the number of network nodes excluding the base station is one has been described above, but a combination of a plurality of other network nodes (for example, an MME and an S-GW) may be provided.

Information and the like can be output from the higher layer (or the lower layer) to the lower layer (or the higher layer). Information and the like may be input/output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination may be performed in accordance with a value (0 or 1) indicated by one bit, may be performed in accordance with a Boolean value (true or false), or may be performed by a comparison of numerical values (for example, a comparison with a value).

Each aspect/embodiment described in this specification may be used alone, may be used in combination, or may be switched in association with execution. Further, a notification of predetermined information (for example, a notification indicating "being X") is not limited to one which is performed explicitly and may be performed implicitly (for example, a notification of predetermined information is not given).

Although the present invention has been described above in detail, it is obvious to those having skill in the art that the present invention is not limited to the embodiments described in this specification. The present invention can be carried out as revisions and modifications without departing from the gist and scope of the present invention decided in claims set forth below. Therefore, the description of this specification is intended to be exemplary and does not have any restrictive meaning to the present invention.

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, and the like may be transmitted and received via a transmission medium. For example, when software is transmitted from a web site, a server, or any other remote source using a wired technology such as a coaxial cable, a fiber optic cable, a twisted pair, or a digital subscriber line (DSL) and/or a wireless technology such as infrared rays, a radio wave, or a microwave, the wired technology and/or the wireless technology are included in a definition of a transmission medium.

Information, signals, and the like described in the present specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in this specification and/or terms necessary for understanding this specification may be replaced with terms having the same or similar meanings. For example, a channel and/or a symbol may be a signal. Further, a signal may be a message. Further, a component carrier (CC) may be referred to as a "carrier frequency," a "cell," or the like.

The terms "system" and "network" used in the present specification are used interchangeably.

Further, information, parameters, and the like described in the present specification may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present specification. Since various channels (for example, the PUCCH, the PDCCH, and the like) and information elements (for example, the TPC or the like) can be identified by suitable names, the various names allocated to the various channels and the information elements are not limited in any respect.

The base station can accommodate one or more (for example, three) cells (also referred to as "sectors"). When the base station accommodates a plurality of cells, the entire coverage area of the base station can be divided into a plurality of smaller areas, and each smaller area can provide communication service through a base station subsystem (for example, a small indoor base station remote radio head (RRH)). The term "cell" or "sector" refers to part or all of the coverage area of the base station and/or the base station subsystem that performs communication service in the coverage. Furthermore, the terms "base station," "eNB," "cell," and "sector" can be used interchangeably in this specification. The base station is also referred to as a fixed station, a Node B, eNodeB (eNB), an access point, a Femto cell, a small cell, or the like.

The mobile station UE is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

The terms "determining" and "deciding" used in this specification may include a wide variety of actions. For example, "determining" and "deciding" may include, for example, events in which events such as calculating, computing, processing, deriving, investigating, looking up (for example, looking up in a table, a database, or another data structure), or ascertaining are regarded as "determining" or "deciding." Further, "determining" and "deciding" may include, for example, events in which events such as receiving (for example, receiving information), transmitting (for example, transmitting information), input, output, or accessing (for example, accessing data in a memory) are regarded as "determining" or "deciding." Further, "determining" and "deciding" may include, for example, events in which events such as resolving, selecting, choosing, establishing, or comparing are regarded as "determining" or "deciding." In other words, "determining" and "deciding" may include events in which a certain operation is regarded as "determining" or "deciding."

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. When used in this specification, two elements may be considered to be "connected" or "coupled" with each other using one or more electric wires, cables and/or a printed electrical connection or using electromagnetic energy such as electromagnetic energy having a wavelength in a radio frequency domain, a microwave region, or a light (both visible and invisible) region as non-limiting and non-exhaustive examples.

A reference signal may be abbreviated as RS and may be called a pilot, depending on a standard to be applied.

A phrase "based on" used in this specification is not limited to "only based on" unless otherwise stated. In other words, a phrase "based on" means both "only based on" and "at least based on."

Any reference to an element using a designation such as "first," "second," or the like used in this specification does not generally restrict quantities or an order of those elements. Such designations can be used in this specification as a convenient method of distinguishing between two or more elements. Thus, reference to the first and second elements does not mean that only two elements can be adopted there, or first element must precede the second element in a certain form.

Further, "means" in the configuration of each of the above devices may be replaced with "unit", "circuit", "device", or the like.

"Including," "comprising," and variations thereof are intended to be comprehensive, similarly to a term "equipped with" as long as the terms are used in this specification or claims set forth below. Furthermore, the term "or" used in this specification or claims set forth below is intended not to be an exclusive disjunction.

A radio frame may be configured with one or more frames in the time domain. Each of one or more frames in the time domain is also referred to as a subframe. Further, the subframe may be configured with one or more slots in the time domain. Further, the slot may be configured with one or more symbols (OFDM symbols, SC-FDMA symbols, or the like) in the time domain. Each of the radio frame, the subframe, the slot, and the symbol indicate a time unit when signals are transmitted. The radio frame, the subframe, the slot, and the symbol may have different corresponding names. For example, in an LTE system, the base station performs scheduling to allocate radio resources (a frequency bandwidth, transmission power or the like usable in each mobile station) to each mobile station. A minimum time unit of scheduling may be referred to as a transmission time interval (TTI). For example, one subframe may be referred to as a TTI, a plurality of consecutive subframes may be referred to as a TTI, or one slot may be referred to as a TTI. The resource block (RB) is a resource allocation unit in the time domain and the frequency domain and may include one or more consecutive subcarriers in the frequency domain. In the time domain of the resource block, one or more symbols may be included, and one slot, one subframe, or one TTI may be used. Each of one TTI and one subframe may be configured with one or more resource blocks. The structure of the radio frame described above is merely an example, and the number of subframes included in the radio frame, the number of slots included in the subframe, the number of symbols and resource blocks included in the slot, and the number of subcarriers included in the resource block can be changed variously.

The embodiments of the present invention have been described above in detail, but the present invention is not limited to the specific embodiments described above, and various changes and modifications can be made within the scope of the gist of the present invention set forth in claims.

The present application is based on Japanese Priority Application No. 2016-158273 filed on Aug. 10, 2016, the entire contents of which are hereby incorporated herein by reference.

What is claimed is:

1. A base station, comprising:
    a transceiver that receives a data flow having a flow identifier and a flow priority via one or more tunnels, wherein each of the one or more tunnels is assigned a Quality of Service (QoS) rule and the QoS rule is indicated to a user apparatus; and
    a processor that maps the received data flow to a radio bearer based on one or more of the flow identifier, the flow priority and the tunnel,
    wherein information indicating the one or more of the flow identifier, the flow priority and the tunnel is received from a core network, and
    wherein the processor maps the received data flow to a radio bearer based on a combination of the flow identifier and the flow priority.

2. The base station according to claim 1, wherein the indication indicating the QoS rule to the user apparatus is performed at a Non Access Stratum (NAS) level.

* * * * *